Aug. 14, 1945.   G. C. SUPPLEE ET AL   2,382,033
LIQUID TREATING METHOD
Filed May 8, 1940   3 Sheets-Sheet 3

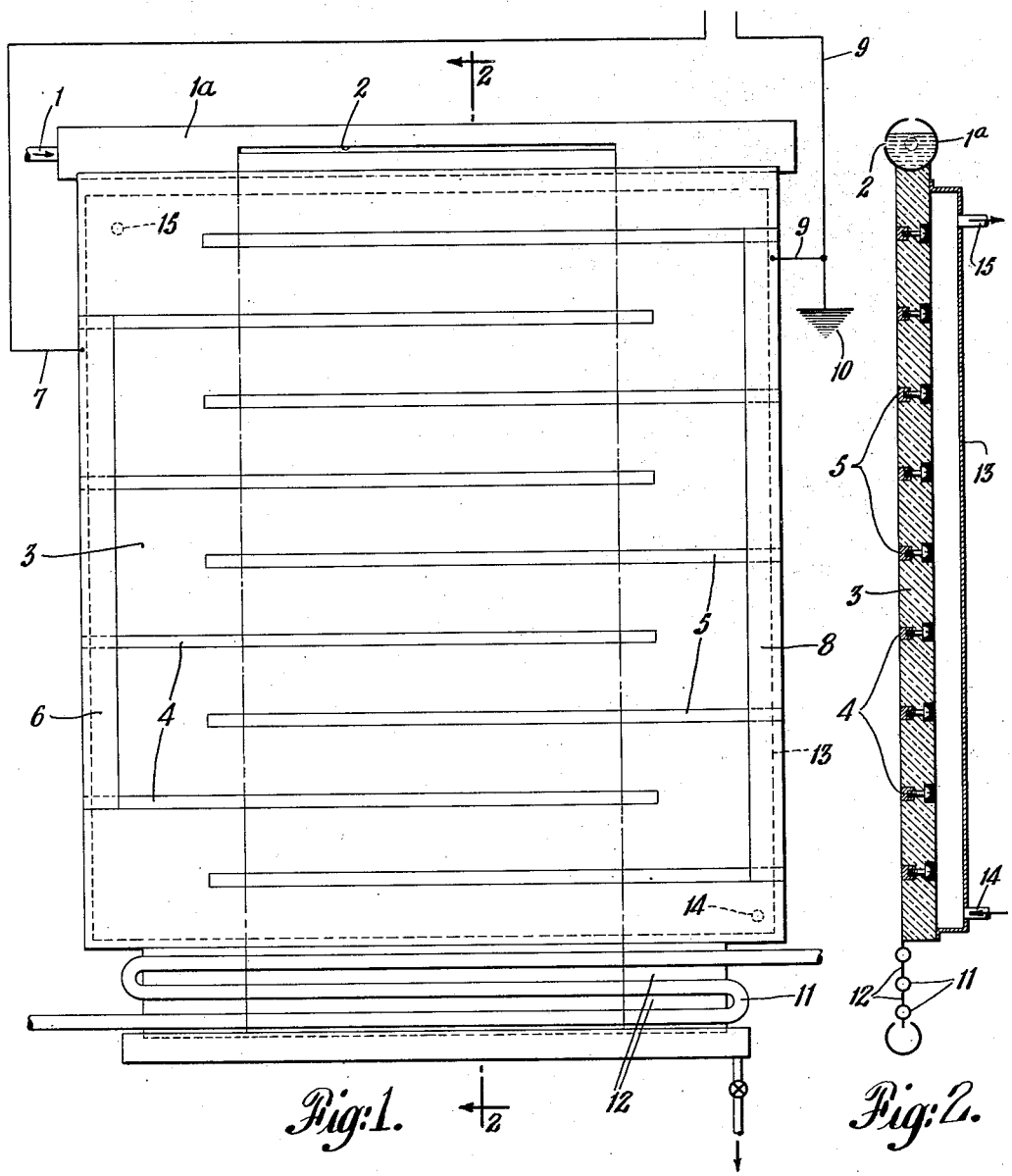

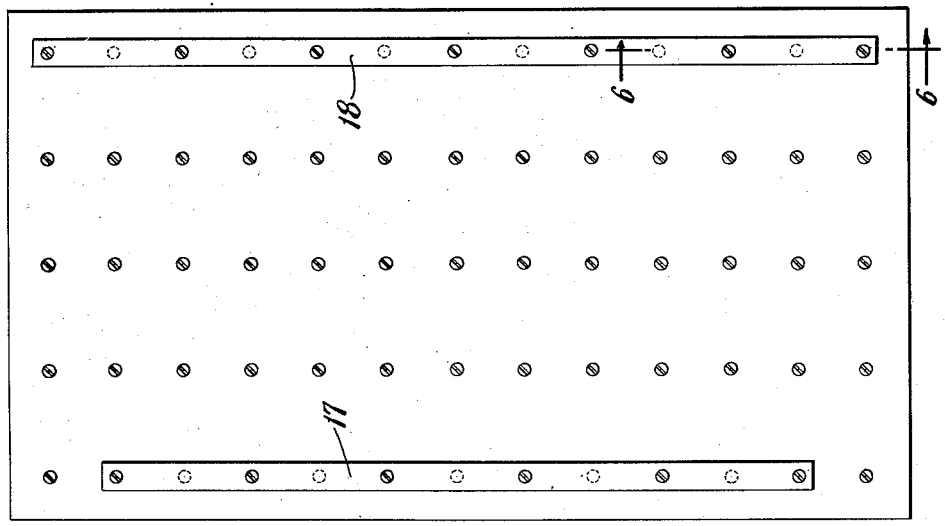
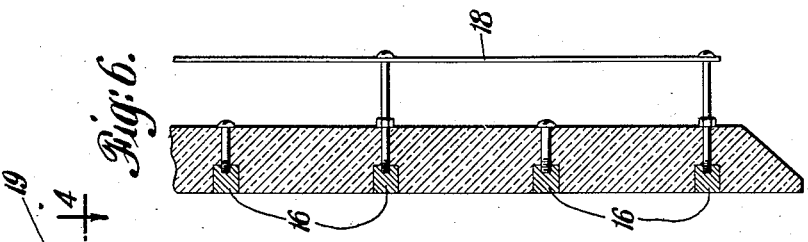
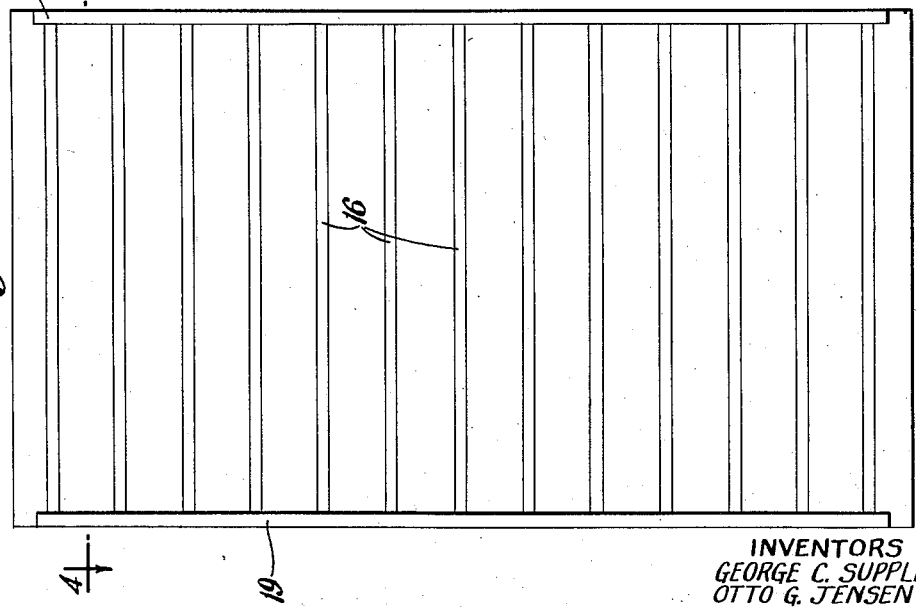

INVENTORS
GEORGE C. SUPPLEE
OTTO G. JENSEN
BY GEORGE E. FLANIGAN
Paul R. Ames
ATTORNEY Patented Aug. 14, 1945

2,382,033

UNITED STATES PATENT OFFICE 2,382,033

LIQUID TREATING METHOD

George C. Supplee, Otto G. Jensen, and George E. Flanigan, Bainbridge, N. Y., assignors to The Borden Company, New York, N. Y., a corporation of New Jersey Application May 8, 1940, Serial No. 333,942

2 Claims. (Cl. 99—221)

This invention relates to a method and apparatus for the treatment of liquids and is particularly concerned with an improved method and apparatus for the treatment of milk, cream and other fluids wherein the liquid may be very rapidly heated and subsequently cooled while flowing in a relatively thin film over a surface.

The lethal effectiveness of elevated temperatures for the destruction of bacteria in milk and other liquids is well known. The methods and apparatus usually employed require heat transfer from a heated surface or medium to the milk or other fluid in which the temperature is to be raised. This involves an element of time which varies in degree with the efficiency inherent in the design and construction of the apparatus, with the specific heat and specific conductivity of the materials, the effectiveness by which the heat from the medium may be transferred to the milk or other fluid, and with other basic considerations inherent in the fluid being heated and in the heating medium. Thus, in such methods for heating or pasteurization of milk there are involved time periods of varying length depending upon the conditions encountered. This includes not only the time required to raise the temperature to the desired degree, but also the time during which the fluid is held at that temperature and the time required to cool or chill the fluid below the temperature at which adverse and deleterious effects are manifested. Since elevated temperatures, particularly for excessive periods of time, have a deleterious effect upon the odor and flavor (or organoleptic effect) and other physical characteristics of milk, it has been necessary in the prior practices of heat treating milk, for example, in pasteurizing, to sacrifice some of the desired decrease in bacteria count in order to avoid creating objectionable flavors and odors and undesirable physical characteristics in the resulting product.

It is an object of the present invention to provide an improved method and apparatus whereby the temperature of milk, cream or other fluids may be elevated to desired temperatures, near the boiling point if required, in an exceedingly short period of time and without contacting the fluid with excessively heated surfaces. A further object is to provide such a method and apparatus in which the liquid, after being heated, may be rapidly cooled or chilled, to near the freezing point if desired, whereby the entire heating and cooling time is reduced to a few seconds. It is another object to provide a method and apparatus whereby the fluid may be alternately and rapidly heated and cooled by a multiple succession of such treatments, as a continuous operation involving no interruption in the continuity of the flow of the mass of fluid being treated.

It is also an object to provide such a method and apparatus in which the liquid is subjected to a high degree of aeration concurrent with the application of heat and also with the cooling, if desired.

A further object is to provide an improved method and apparatus wherein a high degree of bacterial destruction may be accomplished. Another object is to provide a method and apparatus by which the required heating and cooling may be applied to the milk, cream or other fluid in such a manner as to obtain the desired result without deleterious effect upon, and even with an actual improvement in, the characteristics of the fluid, such, for example, as the flavor and odor, the viscosity characteristics and body of the fluid or its constituents, and so forth. Other objects will become apparent.

It has previously been suggested to heat milk or other fluids by passing an electric current through a body of the milk or other fluid. The present invention is concerned with an improvement in such procedures and apparatus wherein the heating of the fluid is accomplished very rapidly and while it flows in a film over the treating surface with the outer surface of the film exposed to the surrounding atmosphere. This surrounding atmosphere may be ordinary atmospheric conditions, or the exposed surface may be under pressure or vacuum, or in the presence of inert or active gases, or mixtures of gases other than air, in the required concentrations, depending upon the effect desired.

This heating step may also be used in conjunction with a cooling step in which the fluid is flowed over a cooling surface, whereby a continuity of temperature rise and temperature fall within a very short space of time may be realized. It may also be utilized to advantage in a sequence of heating and cooling steps.

In applying the invention to the treatment of milk, a continuous film of the milk, of appropriately controlled thickness and other characteristics, may be made to flow over a surface, in which there are positioned suitably designed and positioned electrodes, in such a manner that the film of milk completes the circuit between the electrodes and the resistance of the milk to the flow of electric energy through it produces the desired heating effect.

It is known that an electric current flowing through a conductor will develop heat in the conductor according to the following equation:

$$H = \frac{EIt}{4.18} = \frac{RI^2t}{4.18} = \frac{E^2t}{4.18R}$$

where

H = heat in calories;
E = difference in potential in volts;
I = current in amperes;
t = time in seconds;
R = resistance in ohms.

Milk conducts electricity and has a specific conductivity at room temperature of about $45\text{-}48 \times 10^{-4}$ mhos. In other words, a cube of milk one centimeter square will show a resistance of about 200 ohms. Using this value as a basis, an apparatus may be designed whereby milk as a flowing continuous film of specified capacity, and/or with volumn characteristics susceptible of linear measurements, may be heated to a predetermined temperature during the course of travel over a vertical or an inclined surface, as, for example, under the influence of gravity. The length of time required for the attainment of a desired temperature is controlled by the adjustment of the current density and film capacity appropriately correlated with the linear distance of travel of the flowing film.

In the drawings,

Figure 1 is a diagrammatic front elevation of a suitable treating unit or flow board and Figure 2 is a section on the line 2—2 of Figure 1.

Figure 3 is a diagrammatic front elevation of a modified form of treating unit with the distributor omitted.

Figure 4 is a section on line 4—4 of Figure 3.

Figure 5 is a rear elevation of the flow board shown in Figure 3 and Figure 6 is a section on line 6—6 of Figure 5.

Figure 7:
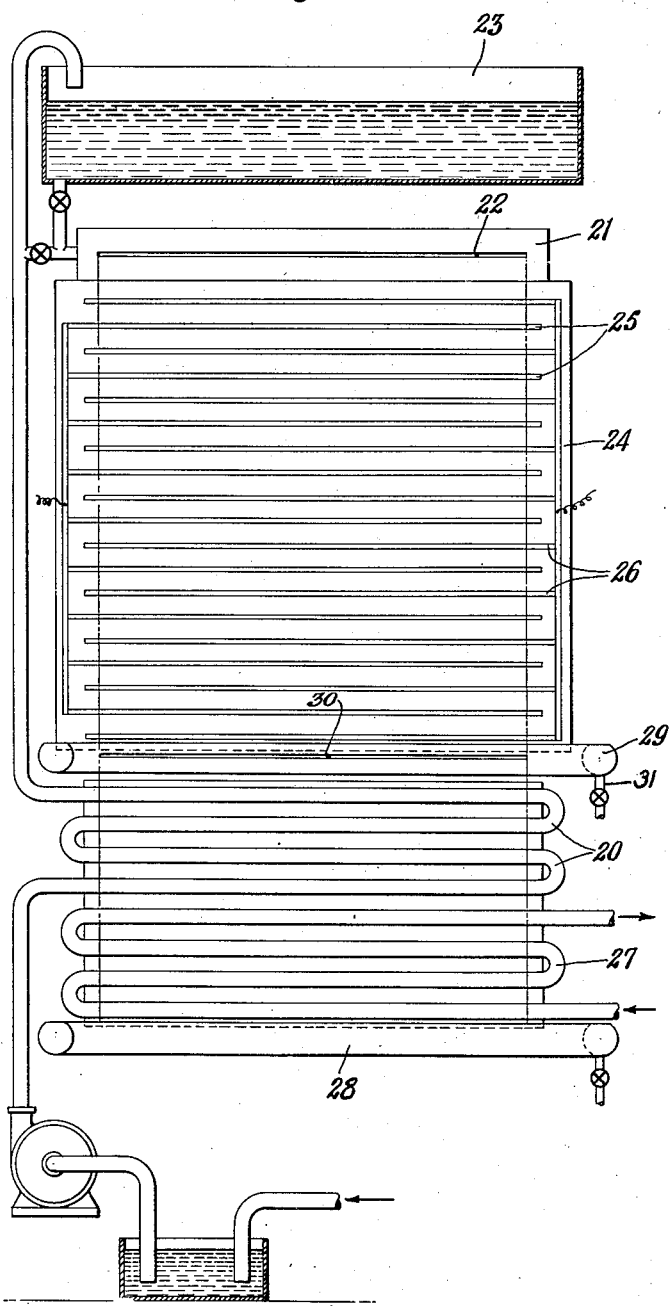
Figure 7 is a diagrammatic front elevation of another modified form of the apparatus.

In the apparatus illustrated in Figures 1 and 2, the liquid is fed through a pipe 1 to a distributing pipe or trough 1a having a slit 2 of such width that a capillary film of the liquid is formed across the slit before it flows through the slit. The formation and control of the flow of such a film are described more fully in Patent No. 2,202,610, granted upon copending application Serial No. 166,084, filed September 28, 1937, and although this particular method of forming and controlling the film has certain advantages, other methods may be used in the formation of films to be treated by the method and apparatus here described. The ribbon or film of liquid flowing from the slit 2 flows down the flow board 3 in which a number of electrodes 4 and 5 are embedded. The electrodes 4 are connected by a conducting bar 6 and through a conductor 7 to one pole of a source of current (not shown). The electrodes 5 are connected to a conducting bar 8 which, in turn, is connected through a conductor 9 to the other pole of the source of electricity. Either one of the electrodes may be grounded, as indicated at 10. Beneath the flow board with the embedded electrodes, there is positioned a cooler 11 made up of a coil of pipe in which the pipes of the coil are adjacent each other or are provided with connecting fins 12 to form a continuous surface over which the milk flows while being cooled. Brine or other suitable cooling medium may be circulated through the cooling unit 11. Other designs or forms of cooling units may likewise be employed, providing they are capable of receiving the heated milk directly from the treating unit (with or without an intermediate distributor) thus permitting continuity of the operation without undue interruption of the flow of the milk or fluid while at the elevated temperature.

In utilizing the apparatus described above, the liquid flows through the slit 2 in a film the width of the length of the slit and at a suitable rate to give the desired heating and flow conditions. The continuous flowing film closes the circuit between the electrodes and a current flows through the film from one electrode to the next. The resistance to flow of electric current through the film between the electrodes causes the elevation in the temperature of the milk during the course of travel over the supporting surface. The time required for a given particle of milk to travel a 12 inch vertical distance under the influence of gravity and at normal room temperature is approximately .8 to one second with a film capacity or rate of 5 ounces per inch per minute. Films of lesser capacity require a fractionally longer time. In view of the heating during flow, the fluidity of the milk will progressively increase as the temperature increases, so the time of flow of the particles over a treating surface of 12 inches will be slightly less than that given above. The liquid is then rapidly cooled to room or other desired temperature. In the procedure described the entire cycle of heating and cooling may be completed in a matter of a few seconds as the film flows over the treating unit and cooler.

As an example of the use of the invention in the pasteurizing of milk, the milk may be flowed over the treating unit described above while the temperature of the milk is being raised from room temperature (about 76° F.) to 160 to 190° F. in less than one second; for instance, in about .8 of a second. A suitable rate of flow for such heating may be from 1 to 5 ounces per minute per inch of width of the film. Films of greater capacity may be employed if adequate current capacity and electrode material and design are provided. The higher the current input, other things being equal, the greater the volume of milk that can be treated in a given time. The milk may then be cooled in a similar length of time to room temperature or lower. As a result of this treatment, the bacteria count in the raw milk may be reduced in excess of 99% of its original count in samples of commercial milks when the temperature is raised to 170° F. or above. When a temperature of 180° F. or above is generated in the milk, the percentage reduction in bacterial count has been found frequently to be as high as 99.9% or even more; bacteria counts on the treated milk showing from 200 to 400 or less per cubic centimeter, when the same milk, untreated, contained several hundred thousand bacteria per cubic centimeter.

In such treatment the treating surface is not substantially heated and the time of exposure to the heat is very short, so local overheating at the solid-fluid interface is avoided. Also, the flow of the liquid over the treating unit in the form of a thin film causes agitation of the liquid and continuous exposure of fresh surfaces to the surrounding atmosphere, whereby volatile substances in the fluid having an objectionable odor or flavor, have an opportunity to escape into the atmosphere and thus give the product an improved flavor and odor or organoleptic effect. Milk subjected to this process has been found to have exceptional keeping qualities and is equal to, if not better, in odor and flavor than the raw milk or milk pasteurized by the usual methods.

If desired the treating unit or both the treating and cooling units may be enclosed, wholly or in part, to retain a humidity controlled atmosphere in contact with the film being treated, or either or both the films may be exposed to reduced pressure, or may be under positive pressure of air, water vapor or other gases.

A wide range of predetermined and controlled elevated temperatures may be employed in this method and apparatus wherein such control is brought about simply by varying the electrical input, which may be automatically or manually regulated by appropriate devices. It has been found that the temperature of the milk may be raised conveniently from 76° F. to 190° F., an increase of 114° F., with film capacities from 1.62 ounces per inch per minute to as high as 5.0 ounces per inch per minute, while flowing over a single unit through a distance of 12 inches. It is also possible to raise the temperature of milk from 50 or 55° F. to as high as 195 to 198° F. during the course of travel on a single heating unit 12 inches long. This represents an increase of practically 150° F. within a period of about one second.

In some instances it may be desirable to use two or more units over which the milk or other fluid is flowed successively. For example, milk may be flowed first over a single heating unit in which the temperature is raised to approximately the desired degree and may then be flowed directly over one or more additional units on which the temperature is maintained substantially at the temperature at which the milk leaves the first unit, thus exposing the milk to the elevated temperature for another second or thereabouts, or more if desired. By this procedure the bacteria count may be further reduced without exceeding a given temperature. Such a procedure is useful, for instance, when it is desired to accomplish the treatment at temperatures below about 180–185° F. For example, in using three units, satisfactory results have been obtained by raising the temperature to about 160° F. on the first unit and maintaining it at that temperature on the second and third units, or by raising it to 180 or 185° F. on the third unit after maintaining it at 160° F. on the first and second units. With such operations reductions in excess of 99% in bacteria count may be readily obtained, with improvements in flavor and odor.

As a further example, three units may be employed wherein the temperature is elevated on each unit a portion of the total desired amount. For instance, in the pasteurization of milk, the milk may be heated on the first unit from 50 or 60° F. to 110 or 120° F.; on the second unit from 110 to 155 or 160° F.; and on the third unit from 155 to 180, 185 or 190° F. In these various operations, the milk may be exposed to the elevated temperatures for a fraction of a second or, if desired, for 2 to 3 seconds or even more. The milk, immediately after exposure to the final temperature required for the purpose of the treatment, may flow as a continuous film from the last heating unit over cooling coils which permit immediate reduction to room temperatures or to 45° F. or lower. The rate of cooling may be controlled by the amount of brine circulated through appropriate cooling coils and may be accomplished in one or two seconds or if desired, may be carried out at a slower or faster rate.

When more than one treating unit is employed the film of fluid upon leaving the preceding unit may fall into a film-forming device of the nature described in Patent No. 2,202,610, or other appropriate means for re-forming a film of controlled characteristics for treatment while flowing over the second treating unit. This re-formation of the film may be repeated for each treating unit, cooling unit or neutral unit (units which do not contribute to further elevation of temperature or reduction in temperature but which may be employed for prolonging for a second or two, exposure to the temperature at which the fluid leaves the preceding unit), used in a particular assembly.

Certain high temperatures are critical in respect to the effect upon the flavor and odor and other physical characteristics of the milk or other liquid being heated. For example, certain milk components, particularly the proteins and more especially lactalbumin, when subjected to high temperatures or even to lower temperatures for extended periods of time, develop a characteristic cooked flavor resembling sulphurated compounds; appropriate delicate tests applied to superheated milk show presence of hydrogen sulfide. For milk, this critical temperature appears to be in the neighborhood of 181 to 185° F. Milk heated to lower temperatures for extended periods or heated in apparatus or equipment involving the principle of heat transfer may likewise show the cooked flavor characteristics. This may be solely due to a higher temperature prevailing at the contact interface between the body of the milk and the heating surface or medium, wherein the interfacial temperature effective on the heat sensitive milk components is at or above the critical temperature or it may be due in part to prolonged exposure to elevated temperatures. An accumulating concentration of the sulphurated split products due to this excessive contact heat or prolonged exposure is gradually manifested as the characteristic cooked flavor condition. The usual types of milk heating equipment do not adequately or thoroughly provide for the escape of volatile split products formed in the milk, and this condition may result even though the body of the fluid never reaches a temperature as high as the critical temperature.

On the other hand, in the method and apparatus of the present invention, the milk is heated by the electrical energy passing through the milk. Adjacent apparatus and equipment parts with which the milk comes in contact are always lower in temperature than the milk itself, or at least never higher; such temperatures as prevail in the apparatus with which the milk comes in contact are produced by the absorption of heat from the milk. Hence, there is no excessive interfacial contact heating of milk components. This permits the heating of the milk in the present apparatus up to the critical temperature without any part of the milk components being heated in excess of this temperature. Even when the milk is heated to above this temperature, accumulation or concentration of such volatile degradation products as to give an objectionable odor or flavor, may be prevented by the thorough degree of aeration inherent in the process.

Thus the natural milk flavor of the milk treated in this manner may be maintained even though exposed to temperatures substantially higher than could be applied in other types of apparatus without imparting a characteristic cooked flavor. Not only is the natural milk flavor retained at these high temperatures, but a readily distinguishable improvement in flavor results. For example, milks have been treated at temperatures as high as 190 to 195° F. without objectionable deleterious flavor or odor and practically all milks heated to temperatures of 185° F. or lower have shown superior flavor to the raw or untreated milk due to the expulsion of volatile matter by the aeration. The exposure of the milk in thin films, with the attendant exposure of new surfaces to the atmosphere along the course of flow, and at progressively increasing temperatures or other temperature control inherent in the arrangement used, present basically ideal physical conditions for the elimination of dissolved gases and volatile material. The changing temperature relationship throughout the film during the course of travel, irrespective of whether one or more units are employed, contribute to an accentuation of particle exposure at the free interface.

The effect of the temperature upon the cream line of the milk is also important and the control of the effective temperatures resulting from the use of the method and apparatus described herein make possible a substantially complete elimination of bacteria without excessive reduction in the cream line after the heating and cooling. For example, by limiting the maximum temperature to 160° F. or even 170° F. over 99% of the bacteria may be destroyed with substantially no loss in cream line. A gradual increase in the reduction in cream line results from temperatures of 170 to 180° F. Under preferred conditions of operation at these higher temperatures the average reduction in cream line is about 18-20% compared with the raw or unheated milk. A marked accentuation in the destructive effects upon cream line occurs in the neighborhood of 190° F.

The surface of the treating unit over which the film flows in the apparatus described herein should have the following characteristics:

(a) It should be rigid and resistant to distortion and warpage under temperature conditions varying from the normal to as high as 212° F. and under alternating conditions of wetting and drying and of heating and cooling.

(b) It should have good electrical resistance when wet (i. e., it should be a non-conductor of electricity).

(c) It should not absorb moisture to any substantial degree.

(d) It should be odorless and incapable of imparting flavor or odor to hot or cold milk or other fluids treated on it.

(e) It should have a low coefficient of expansion, or at least a coefficient of expansion near that of the electrodes used.

(f) It should have good machining or molding properties.

(g) It should not have excessive heat absorption or heat retaining properties.

Certain plastic materials or ceramic materials having the desired characteristics may serve for this purpose. For example, certain casein plastics, such as ameroid, phenolic resins such as Bakelite, methyl acrylate polymers, urea plastics, etc., may be prepared to give the desired characteristics referred to above to a greater or lesser degree. Also, glass or suitable porcelain or other ceramic materials may be prepared to meet the required conditions.

The electrode material may be any suitable conducting metal, carbon or graphite substance, provided it meets the following requirements:

(a) It should not corrode or induce significant electrolysis when the electric current is passing through the milk film or other fluid traveling over the surfaces of the electrodes.

(b) There should be no significant formation of a surface film or oxide or salt on the electrodes as a result of electrolysis.

(c) The electrodes should possess sufficient electrical conductivity so that they do not become heated appreciably while carrying the current to the milk or other film.

Pure nickel or pure tin may be used for this purpose. Graphite electrodes are satisfactory in so far as conductivity and other basic considerations are concerned, but its resistance to wear and disintegration on continued use is not as high as may be desirable in continuous commercial use. Other electrode materials may likewise be used. For example, the noble metals are satisfactory but may be impractical under certain conditions of operation.

The current conducting elements or electrodes 4 and 5 are embedded or inlaid in the surface of the rigid supporting surface over which the milk film flows. The electrodes are positioned flush with the supporting surface, presenting a smooth continuous surface over which the milk film flows. The electrodes may be held in place by screws or small bolts or by other suitable means, depending upon the character of the material used for the supporting surface. For example, where ceramic materials are used, an electrode material, having a coefficient of expansion properly coordinated with that of the ceramic material, may be gripped by the ceramic material in the vitrifying methods commonly employed in that industry, or such electrode material may be poured in a molten condition into grooves in the ceramic material having undercut recesses.

The exact arrangement of the circuits as described herein need not be adhered to. If necessary, auxiliary conductors of copper may be used to interconnect the electrodes of the same polarity or the heads of the screws holding such electrode in position. This might be of particular advantage when carbon or graphite electrodes are used and when the length of the electrode is relatively great.

The spacing of the electrodes is important and depends upon the particular liquid treated and the results desired. The proper distance between electrodes can be calculated from the factors of volume and rate of flow, specific resistance of the film and voltage of the electric current employed. Spacing the electrodes about 1¼ inches apart, has been found satisfactory for film capacities or film flow rates up to 5 ounces or more per inch per minute of horizontal film width.

If the selection of material for the supporting surface or the electrodes is such that excessive heating thereof from the liquid being treated or from the current is likely to result, the supporting surface or if necessary the electrodes themselves may be cooled, for example, by applying a cooling fluid on the rear surface of the flow board or other parts requiring cooling. For instance, when ceramic materials are used, or other materials in which the heat absorption and retention is relatively high, the film has a tendency to dry at the edges and concentrate in the middle of the flow board. To overcome this a stream of water or other cooling liquid may be flowed over the rear surface of the flow board. Or a cooling jacket may be applied to the rear of the flow board, for example, as illustrated at 13 in Figures 1 and 2. This cooling jacket may be cooled by flowing water or other suitable cooling liquid through the inlet pipe 14 and outlet pipe 15. When such cooling means is used, care must be taken to avoid short circuiting the electrodes. For example, in the apparatus illustrated in Figure 2, the heads of the bolts holding the electrodes in place are covered with a water proof and electrically non-conducting material for this purpose. Or, an electrically non-conducting cooling fluid may be used for cooling the flow board or electrodes. Obviously other cooling means may be used in place of that shown as illustrative and this or such other cooling means may be used with the other forms of apparatus referred to in this application.

As a source of electrical energy, an Ajax high frequency converter may be employed. This device operates on a 220 volt 60 cycle feed line and furnishes an induction current of variable voltage at about 50,000 cycles per second. This high frequency current is of particular importance in the use of nickel electrodes, since with a 60 cycle current rather extensive precipitation of proteins may take place on the nickel electrodes, which precipitation is avoided with the 50,000 cycle current. The 60 cycle current, however, does not cause such precipitation of milk components with graphite electrodes. Thus a carbon or graphite type of electrode, of suitable hardness and durability and of appropriate electrical characteristics may be employed with a 60 cycle current or with a current of other characteristics. It is not intended, therefore, to limit the invention to any particular type of current. Also, the current frequencies referred to are merely given as illustrative of high and low frequencies and are not intended as limiting such frequencies to the particular values given.

If desired, the treating unit may be of the construction illustrated in Figures 3 to 6, in which the electrodes 16 extend all the way across the unit and alternate electrodes are connected together at the rear of the unit through conducting bars 17 and 18. In either arrangement, the unit may be provided with side flanges 19 and the slit in the distributing pipe or trough (not shown) may be of the full width of the unit, so that the entire surface of the unit may be used. Such an arrangement of the electrodes may be used in the other units referred to herein.

The treating units described above may be used in conjunction with a preheater, as illustrated in Figure 7. In that apparatus the liquid to be treated is pumped through a preheating or regenerator coil (heat exchanger) 20 and from there directly to the distributor trough or pipe 21 having a slit 22 or, if desired, to a storage vessel 23 for the preheated milk. The film then flows over the treating unit 24 having electrodes 25 and 26. From the treating unit the milk may flow in a continuous film directly over the preheater 20 and the cooler 27, which latter may be cooled by brine or other suitable cooling medium, and into a collecting trough 28. If preferred, a flow diversion and redistribution device 29 with a slit 30 may be interposed between the treating unit and a preheater, and/or cooling unit to afford better control of the film and/or to provide means for preventing inadequately heated milk from passing over the cooler or preheater. For example, at the beginning of the operation, and until the desired temperature is reached this device may be used to divert the flow of such film as it leaves the treating unit through the outlet pipe 31; likewise, whenever, during the operation, the temperature drops below a safe point due to fluctuations or interruptions in the current supply or to other inadvertencies, the inadequately heated milk may be diverted in the manner indicated thereby preventing the admixture of such milk with the normally or properly processed product.

With this apparatus the liquid may be subjected to preheating before the electrical heating of the film flowing over the supporting surface, and may be subsequently chilled to the desired degree, utilizing the liquid to be treated as part of the cooling medium. The preheating of the liquid serves to conserve the current required to accomplish the desired heating but should not be such as to maintain the liquid at too high a temperature or for too long a time. Such preheating may be, for example, to 90 to 145° F. but is preferably not over 120–130° F.

When the treating units described herein are used in series, each unit may be operated from separate sources of electricity, or, preferably, may be electrically connected in parallel. The units may be spaced one above the other, so that there will be continuous flow over the successive units or films of controlled characteristics may be reformed by inserting film forming members between each of the units.

Figure 8:
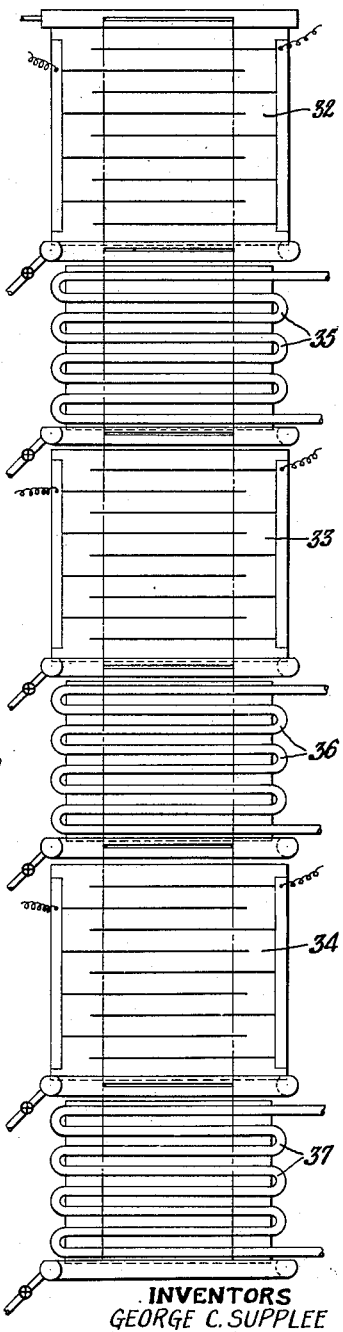
Figure 8 is a diagrammatic front elevation of still another form of the apparatus.

Also, cooling units may be positioned alternately between the treating units, as illustrated in Figure 8. In this illustration the heating units 32, 33 and 34 have positioned between them cooling units 35, 36 and 37. Film forming members may be provided between any of the units as required. With this apparatus the film of liquid may be subjected to successive alternate heating and cooling treatments.

In any of the modifications described herein, the means for controlling the flow of liquid onto the treating units or onto the coolers may be varied, with or without loss of some of the advantages of the arrangement described. For example, the liquid may flow over an edge instead of through a slit. Also, the feed to the distributing means may be through the bottom of the distributor and/or a baffle, over or under which the liquid flows, may be used with the slit or edge for holding back foam or for preventing currents from interfering with the regularity of the flow. Where less accurate control of the film is desired, a distributor with a slit or perforations in the bottom may be used.

In describing the invention specific reference has been made to its use in the treatment of milk, particularly for pasteurizing the same. However, it is obvious that it may be used in other connections where rapid heating, with or without subsequent cooling, is desirable. For instance, it may be used in the pasteurizing or sterilizing of other liquids, such as beer, wine, cider, other fruit juices, or other fluids that will conduct a current but will offer sufficient resistance to the flow of the electric current to generate heat as a result of the electric input. It may also be used in the pasteurizing or sterilization of cream or evaporated milk or in the treatment of these or other liquids for other purposes, such as the treatment of cream to increase its viscosity or body, or the treatment of milk to increase its cream line, and for many other uses.

For example, a cream containing a 40% butter fat was heated to pasteurizing temperature as described above, followed by rapid cooling to 45° F. temperature, to reduce the bacteria count from 74,500 per cc. in the raw cream to 500 per cc. in the pasteurized cream, with an actual improvement in the cream body or viscosity, compared with the raw cream, which improvement was apparent after a few hours storage at refrigerator temperatures (45° F.) and extended throughout a 40 hour observation period.

Even greater improvement may be accomplished by careful control of the heating and cooling periods in a multiple unit apparatus with coolers between the treating units.

The heating of the liquid as described herein may also be used in combination with other treatments of the liquid, such for example, as treatment with ultra violet rays to improve its anti-rachitic effectiveness, or treatments with gases to bring about desired reactions.

Also, with the method and apparatus described, radiant heat or other forms of radiant energy may be applied to the free interface of the flowing film concurrently with the electrically induced elevated temperatures to which the milk or other fluid is being subjected, as a supplementing treatment for effecting desired results. For illustration, if it is desired to accentuate the effect of heat at the free interface, with or without reliance upon penetration for augmenting the elevation in temperature of the mass of the flowing liquid, appropriate heating units which radiate heat through the atmosphere may be positioned opposite the flowing film in such a manner and at such distance that the flowing film absorbs the radiated heat, elevating the temperature of the mass to a degree commensurate with the energy impinged on the film, but more particularly for accentuating the effect of elevated temperature at the free interface. Electric heating units capable of yielding a large percentage of infra red rays such as a resistance unit or a silica carbide unit of the "Globar" type may be used for radiating heat energy in application of the method described. Radiant energy of other types may be similarly applied, particularly under conditions where desired results are initiated, intensified or accelerated as a result of the combined influence of heat, flow of electric current through the film, short exposure time, and the complementing influence of the radiant energy applied at the free interface.

It is obvious that many variations may be made in utilizing the invention described herein. For example, the rate of flow, the rate of heating, the temperature, and the rate of cooling may be varied, depending upon the particular results desired. It is also obvious that many variations may be made in the details of the apparatus in utilizing the invention. For instance, the various features described in connection with the different modifications may be used with each other or the order or arrangement of the various units or the manner of controlling the flow of liquid on the treating units or coolers, may be altered.

For instance, while the treating and/or cooling units described herein have been shown to have flat or at least horizontally flat surfaces, cylindrical or other curved treating and cooling units embodying the principles involved may likewise be employed. Such treating units may be designed and constructed with the electrodes positioned on the inner or outer surface, or both surfaces of a hollow cylinder; the film of liquid being caused to flow over one or both surfaces, depending upon the details of design and construction. Likewise, electrodes may be embedded in both surfaces of the flat treating units, with appropriate revision in the design and construction illustrated in the drawings accompanying this specification. The double surface treating and/or cooling units obviously permit greater capacity of operation with the minimum of equipment.

In the apparatus illustrated, the electrodes have been shown as extending horizontally. If desired, however, they may extend vertically or in some other direction, suitable provision being made for the differences in effect of such heating.

Also, a single flow board may be supplied with a plurality of units extending horizontally or vertically, which may be connected to separate electrical circuits or otherwise arranged so that different current input may be supplied to different parts of the film.

Although specific reference has been made to gravity flow of the film over a vertical or inclined surface, the film may be flowed in other ways than by gravity over surfaces that are horizontal or otherwise positioned. For example, the films may be made to flow by centrifugal force over a board having the electrodes radially or annularly positioned.

The terms used in describing the invention have been used in their descriptive sense and not as terms of limitation, it being intended that all equivalents of the terms used be included within the scope of the appended claims.

We claim:

1. A method for pasteurizing a liquid, comprising flowing the liquid over a surface in a film that is unconfined on one side while conducting an electric current through the liquid to increase the temperature of the liquid from below about 100° F. to above about 160° F., and thereupon rapidly cooling the liquid to below a temperature that is deleterious, said heating and cooling steps constituting a substantial continuity of temperature rise and drop in not over about 5 seconds' time.

2. A method for pasteurizing a liquid, comprising flowing the liquid over a surface in a film that is unconfined on one side while conducting an electric current through the liquid to increase the temperature of the liquid from below about 100° F. to above about 160° F., and thereupon rapidly cooling the liquid at least to room temperature, said heating step requiring not over one second and said heating and cooling steps constituting a substantial continuity of temperature rise and drop in not over 3 seconds' time.

GEORGE C. SUPPLEE.
OTTO G. JENSEN.
GEORGE E. FLANIGAN.